United States Patent
Yang et al.

(10) Patent No.: US 11,770,522 B2
(45) Date of Patent: Sep. 26, 2023

(54) PICTURE DISPLAY ORDER DETERMINING METHOD AND APPARATUS, AND VIDEO CODING DEVICE

(71) Applicant: HUAWEI TECHNOLOGIES CO., LTD., Shenzhen (CN)

(72) Inventors: Haitao Yang, Shenzhen (CN); Yuqun Fan, Shenzhen (CN); Xiang Ma, Shenzhen (CN); Huanbang Chen, Shenzhen (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/382,421

(22) Filed: Jul. 22, 2021

(65) Prior Publication Data
US 2021/0360235 A1 Nov. 18, 2021

Related U.S. Application Data

(63) Continuation of application No. PCT/CN2019/112959, filed on Oct. 24, 2019.

(30) Foreign Application Priority Data

Jan. 23, 2019 (CN) .......................... 201910065224.3
Jul. 25, 2019 (CN) .......................... 201910679070.7

(51) Int. Cl.
*H04N 19/112* (2014.01)
*H04N 19/105* (2014.01)
(Continued)

(52) U.S. Cl.
CPC ......... *H04N 19/112* (2014.11); *H04N 19/105* (2014.11); *H04N 19/137* (2014.11);
(Continued)

(58) Field of Classification Search
CPC .. H04N 19/112; H04N 19/105; H04N 19/137; H04N 19/172; H04N 19/513; H04N 19/70; H04N 19/82
See application file for complete search history.

(56) References Cited

U.S. PATENT DOCUMENTS 6,031,584 A * 2/2000 Gray ............. H04N 21/440281
375/E7.022
6,801,710 B1 10/2004 Halfant
(Continued)

FOREIGN PATENT DOCUMENTS

CN 1794812 A 6/2006
CN 103716638 A 4/2014
(Continued)

OTHER PUBLICATIONS

ITU-T H.261 (Mar. 1993), Line Transmission of Non-Telephone Signals, Video Codec for Audiovisual Services AT p x 64 kbits, total 29 pages.
(Continued)

*Primary Examiner* — Fabio S Lima
(74) *Attorney, Agent, or Firm* — Rimon PC

(57) ABSTRACT

This application discloses a picture display order determining method which includes: obtaining a decoding order index value of a current picture and a decoding order index value of a previous picture that is adjacent to the current picture according to a decoding order; adding 1 to a cycle identifier value when the decoding order index value of the current picture is less than the decoding order index value of the previous picture; and determining a display order index value of the current picture based on a sum of the decoding order index value of the current picture and a preset positive integer multiple of the cycle identifier value. In this application, the display order index value of the current picture
(Continued)

progressively increases based on a display order index value of a picture that is located before the current picture according to the decoding order.

20 Claims, 8 Drawing Sheets

(51) Int. Cl.
    *H04N 19/137*    (2014.01)
    *H04N 19/172*    (2014.01)
    *H04N 19/513*    (2014.01)
    *H04N 19/70*    (2014.01)
    *H04N 19/82*    (2014.01)
    *H04N 19/124*    (2014.01)

(52) U.S. Cl.
    CPC ......... *H04N 19/172* (2014.11); *H04N 19/513* (2014.11); *H04N 19/70* (2014.11); *H04N 19/82* (2014.11); *H04N 19/124* (2014.11)

(56) References Cited

U.S. PATENT DOCUMENTS

| | | | | |
|---|---|---|---|---|
| 10,165,282 | B2* | 12/2018 | Hendry | H04N 19/423 |
| 10,582,208 | B2* | 3/2020 | Kazui | H04N 19/503 |
| 2012/0189048 | A1 | 7/2012 | Sakaniwa | |
| 2014/0049605 | A1 | 2/2014 | Chen et al. | |

FOREIGN PATENT DOCUMENTS

| | | |
|---|---|---|
| CN | 103873872 A | 6/2014 |
| WO | 2013151634 A1 | 10/2013 |

OTHER PUBLICATIONS

ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.

* cited by examiner

PICTURE DISPLAY ORDER DETERMINING METHOD AND APPARATUS, AND VIDEO CODING DEVICE

CROSS-REFERENCE TO RELATED APPLICATIONS

This application is a continuation of International Application No. PCT/CN2019/112959, filed on Oct. 24, 2019, which claims priority to Chinese Patent Application No. 201910065224.3, filed on Jan. 23, 2019, and Chinese Patent Application No. 201910679070.7, filed on Jul. 25, 2019. All of the aforementioned patent applications are hereby incorporated by reference in their entireties.

TECHNICAL FIELD

This application relates to the video coding field, and in particular, to a picture display order determining method and apparatus, and a video coding device.

BACKGROUND

With development of information technologies, video services such as high definition television, web conferencing, internet protocol television (internet protocol television, IPTV), and 3D television rapidly develop. Video signals have become a most important way to obtain information in people's daily life because of advantages such as intuitiveness and high efficiency of the video signals. A video includes a large amount of data, and therefore occupies a large amount of transmission bandwidth and storage space. For effective transmission and storage of the video, the video needs to be encoded and decoded. Therefore, video encoding and decoding technologies have become increasingly indispensable key technologies in the video application field.

An encoder side may encode a video picture to obtain a bitstream. After the encoder side sends the bitstream to a decoder side, the decoder side may decode the bitstream to reconstruct the video picture. Video pictures are arranged in a bitstream in a bitstream order. The bitstream order is the same as a decoding order, while the decoding order may be different from a display order. The decoding order is an order of decoding encoded pictures based on a prediction relationship between the encoded pictures. The display order is an order of displaying decoded pictures.

SUMMARY

This application provides a picture display order determining method and apparatus, and a video coding device, so that a display order index value of a picture is progressively increasing. The technical solutions are as follows:

According to a first aspect, a picture display order determining method is provided. The method includes: obtaining a decoding order index value of a current picture and a decoding order index value of a previous picture that is adjacent to the current picture according to a decoding order; adding 1 to a cycle identifier value when the decoding order index value of the current picture is less than the decoding order index value of the previous picture; and determining a display order index value of the current picture based on a sum of the decoding order index value of the current picture and a preset positive integer multiple of the cycle identifier value.

It should be noted that the preset positive integer may be preset, and may be set based on a quantity of pictures whose decoding order index values belong to one cycle. For example, the preset positive integer may be 256.

In this embodiment of this application, the display order index value of the current picture is determined based on the sum of the decoding order index value of the current picture and the preset positive integer multiple of the cycle identifier value. Because the preset positive integer multiple of the cycle identifier value is a quantity of pictures whose decoding order index values belong to all cycles before a cycle in which the current picture is located, when the display order index value of the current picture is determined based on the sum of the decoding order index value of the current picture and the preset positive integer multiple of the cycle identifier value, the display order index value of the current picture is progressively increasing based on a display order index value of a picture that is located before the current picture according to the decoding order. In other words, in this embodiment of this application, a decoding order index value of a picture is cyclic, and a display order index value of the picture is progressively increasing.

The display order index value of the current picture is determined according to the following formula:

$$POI=DOI+PictureOutputDelay-OutputReorderDelay+length \times DOICycleCnt,$$

where

POI represents the display order index value of the current picture, DOI represents the decoding order index value of the current picture, PictureOutputDelay represents a picture output delay value, OutputReorderDelay represents a picture reordering delay value, length represents the preset positive integer, and DOICycleCnt represents the cycle identifier value.

In this embodiment of this application, when the decoding order index value of the current picture is less than the decoding order index value of the previous picture, 1 is added to the cycle identifier value, to obtain a new cycle identifier value; or when the decoding order index value of the current picture is not less than the decoding order index value of the previous picture, the cycle identifier value is not updated. Then, the display order index value of the current picture is obtained by adding the decoding order index value of the current picture and a picture output delay value, then subtracting a picture reordering delay value, and finally adding a product of the preset positive integer and the cycle identifier value. In this way, the display order index value of the current picture is progressively increasing based on a display order index value of a picture that is located before the current picture according to the decoding order.

Further, the method further includes: subtracting the preset positive integer from each of decoding order index values of all pictures in a reference picture buffer of the current picture when the decoding order index value of the current picture is less than the decoding order index value of the previous picture, to update the decoding order index values of all the pictures. In this way, a picture can be obtained more quickly from the reference picture buffer based on an updated decoding order index value and output for display.

It should be noted that, to ensure output efficiency of a picture and prediction accuracy of the picture, an absolute value of a difference between a display order index value of any picture in the reference picture buffer and a display order index value of the current picture is less than a value obtained by dividing the preset positive integer by 2.

Further, the method further includes: setting the cycle identifier value to 0 when a sequence header or a sequence start code of a video sequence in which the current picture is located is decoded.

It should be noted that, decoding of the sequence header or the sequence start code of the video sequence in which the current picture is located means that decoding of the video sequence is just started, and therefore the cycle identifier value can be set to 0. In this case, when a decoding order index value of a picture in the video sequence belongs to the first cycle, the cycle identifier value is not introduced into calculation of a display order index value. Subsequently, the cycle identifier value is updated by adding 1 to the cycle identifier value each time the decoding order index value of the picture in the video sequence enters a new cycle, and the display order index value is calculated by using an updated cycle identifier value in the new cycle.

Further, the method further includes: obtaining motion information of the current picture based on the display order index value of the current picture and a display order index value of a reference picture of the current picture.

It should be noted that the motion information of the current picture may be motion information of a current picture block in the current picture, and the motion information of the current picture block may include indication information of a prediction direction (which is usually prediction by using a first reference picture list, prediction by using a second reference picture list, or prediction by using both the lists), one or two motion vectors pointing to one or two reference blocks, indication information of a picture in which the reference block is located (usually referred to as a reference frame index), and the like.

The obtaining motion information of the current picture based on the display order index value of the current picture and a display order index value of a reference picture of the current picture includes: determining a distance index value of the current picture based on the display order index value of the current picture; determining a distance index value of the reference picture based on the display order index value of the reference picture or the display order index value of the current picture; subtracting the distance index value of the reference picture from the distance index value of the current picture, to obtain a distance between the current picture and the reference picture; and determining the motion information of the current picture based on the distance between the current picture and the reference picture.

It should be noted that the reference picture of the current picture is a picture in which a reference block of the current picture block in the current picture is located, and the distance between the current picture and the reference picture is a distance between the current picture block and the reference block.

In addition, a distance index value of a picture is used to indicate a distance between the picture and a reference picture of the picture, and may be specifically used to indicate a distance between a picture block in the picture and a reference block (belonging to the reference picture of the picture) pointed by a motion vector of the picture block. The distance index value of the picture may be obtained from a bitstream of a picture header of the picture.

The determining a distance index value of the current picture based on the display order index value of the current picture includes: multiplying 2 by the display order index value of the current picture, and using an obtained value as the distance index value of the current picture.

The determining a distance index value of the reference picture based on the display order index value of the reference picture or the display order index value of the current picture includes: when the reference picture is a library picture, multiplying 2 by a value obtained by subtracting 1 from the display order index value of the current picture, and using an obtained value as the distance index value of the reference picture; or when the reference picture is not a library picture, multiplying 2 by the display order index value of the reference picture, and using an obtained value as the distance index value of the reference picture.

It should be noted that the library picture is a reference picture that is not in a current bitstream and that is used to decode the current bitstream, and the library picture is not output for display. For example, the library picture may be a reference picture externally input from a decoder.

The determining the motion information of the current picture based on the distance between the current picture and the reference picture includes: determining a colocated picture of the current picture; determining a colocated picture block that is in the colocated picture and whose location is the same as a location of the current picture block in the current picture; obtaining a motion vector of the colocated picture block; obtaining a distance between the colocated picture and a colocated reference picture, where the colocated reference picture is a picture in which a picture block pointed by the motion vector of the colocated picture block is located; and scaling the motion vector of the colocated picture block based on the distance between the current picture and the reference picture and the distance between the colocated picture and the colocated reference picture, to obtain a motion vector of the current picture block.

It should be noted that the colocated picture of the current picture may be a picture that is in decoded pictures and whose display order index value is relatively close to the display order index value of the current picture. For example, the colocated picture of the current picture may be a previous picture that is adjacent to the current picture according to a display order. Alternatively, the colocated picture of the current picture may be obtained based on a bitstream. To be specific, the bitstream may include information used to indicate the colocated picture of the current picture. The information may include indication information of a list in which the colocated picture is located and an index number of the colocated picture. For example, the information may indicate that the colocated picture of the current picture is a reference picture whose index number is 0 in the first reference picture list.

In addition, the colocated picture block in the colocated picture may be specifically a picture block that is in the colocated picture and that includes a luma sample at a location corresponding to a location of a top-left luma sample of the current picture block in the current picture. In this case, the motion vector of the colocated picture block is a motion vector of the luma sample. The motion vector of the colocated picture block may be obtained from a motion information storage unit corresponding to the colocated picture block.

In this embodiment of this application, there is a high temporal correlation between the current picture and the colocated picture. Therefore, motion of the current picture block in the current picture is relatively close to motion of the colocated picture block in the colocated picture, and the motion vector of the current picture block can be obtained by scaling the motion vector of the colocated picture block based on the distance between the current picture and the reference picture of the current picture and the distance between the colocated picture and the colocated reference picture.

The obtaining a distance between the colocated picture and a colocated reference picture includes: obtaining a distance index value of the colocated picture and a distance index value of the colocated reference picture; and subtracting the distance index value of the colocated reference picture from the distance index value of the colocated picture, to obtain the distance between the colocated picture and the colocated reference picture.

The motion vector of the current picture block is determined according to the following formulas:

$$mvE\_x = \text{Clip3}(-32768, 32767, \text{Sign}(mvRef\_x \times BlockDistanceL \times BlockDistanceRef) \times (((\text{Abs}(mvRef\_x \times BlockDistanceL \times (16384/BlockDistanceRef))) + 8192) >> 14)), \text{ and}$$

$$mvE\_y = \text{Clip3}(-32768, 32767, \text{Sign}(mvRef\_y \times BlockDistanceL \times BlockDistanceRef) \times (((\text{Abs}(mvRef\_y \times BlockDistanceL \times (16384/BlockDistanceRef))) + 8192) >> 14)), \text{ where}$$

mvE_x represents a horizontal component of the motion vector of the current picture block, mvE_y represents a vertical component of the motion vector of the current picture block, mvRef_x represents a horizontal component of the motion vector of the colocated picture block, mvRef_y represents a vertical component of the motion vector of the colocated picture block, BlockDistanceL represents the distance between the current picture and the reference picture, and BlockDistanceRef represents the distance between the colocated picture and the colocated reference picture.

According to a second aspect, a picture display order determining apparatus is provided. The picture display order determining apparatus has a function of implementing behavior of the picture display order determining method according to the first aspect. The picture display order determining apparatus includes at least one module, and the at least one module is configured to implement the picture display order determining method according to the first aspect.

According to a third aspect, a picture display order determining apparatus is provided. A structure of the picture display order determining apparatus includes a processor and a memory. The memory is configured to: store a program that supports the picture display order determining apparatus to perform the picture display order determining method according to the first aspect, and store data used in the picture display order determining method according to the first aspect. The processor is configured to execute the program stored in the memory. The picture display order determining apparatus may further include a communications bus. The communications bus is used to establish a connection between the processor and the memory.

According to a fourth aspect, a video coding device is provided. The device includes a nonvolatile memory and a processor that are coupled to each other. The processor invokes program code stored in the memory, to perform the method according to the first aspect.

According to a fifth aspect, a computer-readable storage medium is provided. The computer-readable storage medium stores instructions. When the instructions are run on a computer, the computer is enabled to perform the picture display order determining method according to the first aspect.

According to a fifth aspect, a computer program product including instructions is provided. When the computer program product runs on a computer, the computer is enabled to perform the picture display order determining method according to the first aspect.

Technical effects achieved in the second aspect, the third aspect, the fourth aspect, the fifth aspect, and the sixth aspect are similar to technical effects achieved by using corresponding technical means in the first aspect. Details are not described herein again.

The technical solutions provided in this application can bring at least the following beneficial effects:

The decoding order index value of the current picture and the decoding order index value of the previous picture that is adjacent to the current picture according to the decoding order are obtained, and then 1 is added to the cycle identifier value when the decoding order index value of the current picture is less than the decoding order index value of the previous picture. Then, the display order index value of the current picture is determined based on the sum of the decoding order index value of the current picture and the preset positive integer multiple of the cycle identifier value. Because the preset positive integer multiple of the cycle identifier value is the quantity of pictures whose decoding order index values belong to all cycles before the cycle in which the current picture is located, when the display order index value of the current picture is determined based on the sum of the decoding order index value of the current picture and the preset positive integer multiple of the cycle identifier value, the display order index value of the current picture is progressively increasing based on a display order index value of a picture that is located before the current picture according to the decoding order. In other words, a display order index value of a picture in the embodiments of this application is progressively increasing.

DESCRIPTION OF EMBODIMENTS

Figure 1:
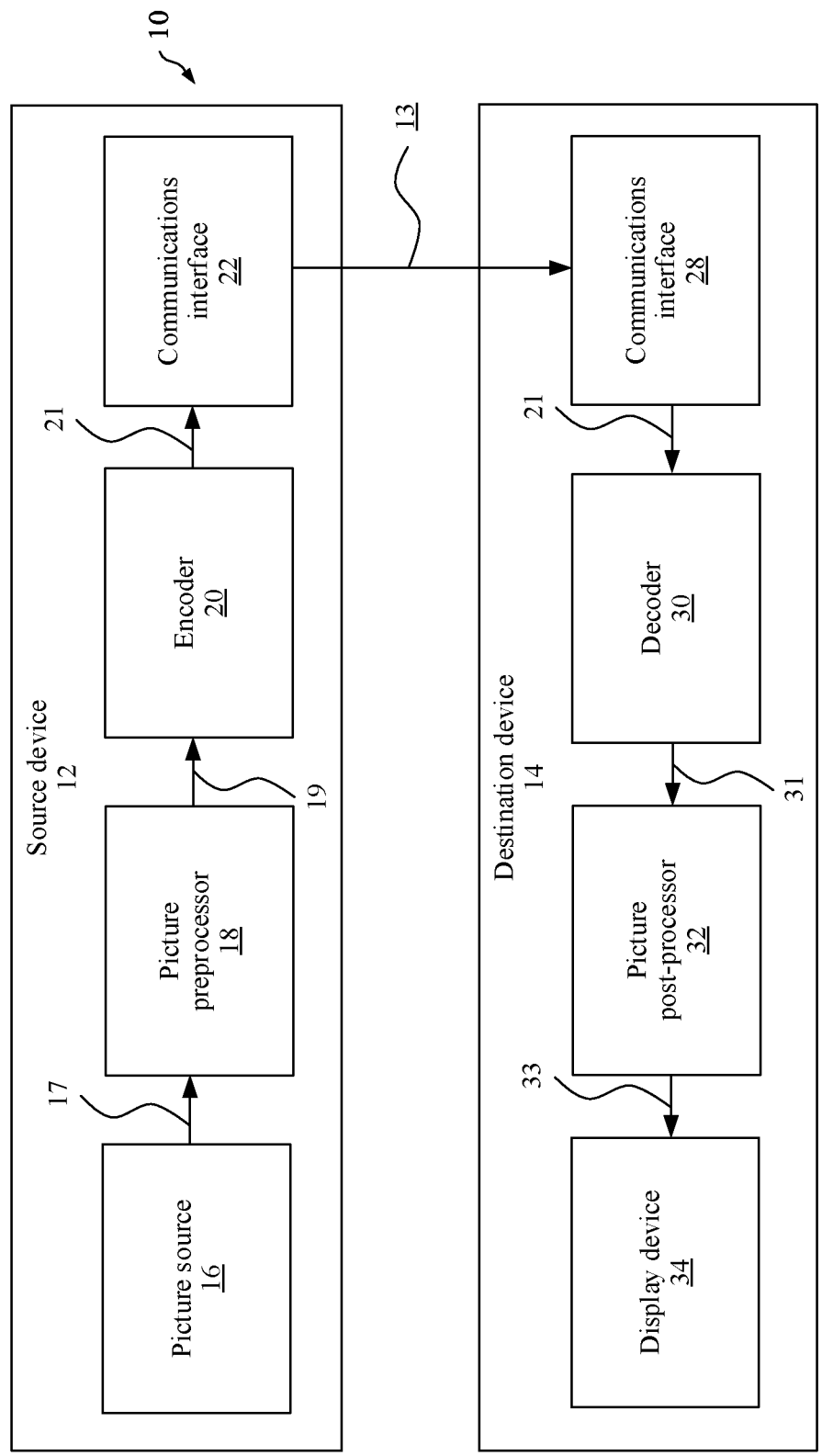
FIG. 1 is a block diagram of a video encoding and decoding system according to an embodiment of this application.

To make the objectives, technical solutions, and advantages of this application clearer, the following further describes the embodiments of this application in detail with reference to the accompanying drawings.

Before the embodiments of this application are explained and described, application scenarios of the embodiments of this application are first briefly described.

With development of information technologies, video services such as high definition television, web conferencing, IPTV, and 3D television rapidly develop. Video signals have become a most important way to obtain information in people's daily life because of advantages such as intuitiveness and high efficiency of the video signals. A video includes a large amount of data, and therefore occupies a large amount of transmission bandwidth and storage space. For effective transmission and storage of the video, the video needs to be encoded and decoded. Therefore, video encoding and decoding technologies have become increasingly indispensable key technologies in the video application field. Coding is also referred to as compression or compression coding. This is not limited in the embodiments of this application.

The following explains and describes a video encoding process and a video decoding process.

The encoding process mainly includes steps such as intra prediction (intra prediction), inter prediction (inter prediction), transform (transform), quantization (quantization), and entropy encoding (entropy encode). Specifically, after a to-be-encoded picture is divided into picture blocks, for each picture block, intra prediction or inter prediction is performed on the picture block. Intra prediction is to predict a pixel value of a pixel in the picture block by using a pixel value of a pixel in an encoded area of the picture. Inter prediction is to find a matched reference block for the picture block from encoded pictures, and use a pixel value of a pixel in the reference block as a predictor of the pixel value of the pixel in the picture block. After the predictor of the pixel value of the pixel in the picture block is obtained through intra prediction or inter prediction, the corresponding predictor is subtracted from the pixel value of the pixel in the picture block to obtain residual information, and the residual information is then transformed and quantized and finally entropy encoded to obtain and output a compressed bitstream. The picture block herein is an array including M×N pixels with known pixel values, where both M and N are positive integers, and M may be equal to N, or may not be equal to N.

The decoding process is equivalent to an inverse process of the encoding process. For example, for each picture block in a to-be-decoded picture, residual information may be first obtained by performing entropy decoding, dequantization, and inverse transform, and then whether a prediction mode for the picture block is intra prediction or inter prediction is determined. If intra prediction is performed, a predictor of a pixel in the picture block is constructed by using a pixel value of a pixel in a decoded area in the picture that includes the picture block. If inter prediction is performed, motion information of the picture block needs to be first determined, then a reference block is determined from a decoded picture based on the motion information, and a pixel value of a pixel in the reference block is used as a predictor of a pixel in the picture block. Finally, the picture block may be decoded based on the residual information and the predictor.

The following explains and describes inter prediction.

Inter prediction is a process in which a matched reference block is found from encoded reference pictures for a picture block in a to-be-encoded picture and a pixel value of a pixel in the reference block is used as a predictor of a pixel value of a pixel in the picture block. This process is referred to as motion estimation (ME). Then, motion information of the picture block is transmitted. In the motion estimation process, a plurality of reference blocks in the reference pictures need to be matched for the picture block, and which reference block or reference blocks are finally used for inter prediction may be determined through rate-distortion optimization (RDO) or by using another method.

The motion information of the picture block may include indication information of a prediction direction (which is usually prediction by using a first reference picture list, prediction by using a second reference picture list, or prediction by using the two lists, and for example, may be information indicated by a prediction reference mode identifier inter_pred_ref_mode), one or two motion vectors (MV) pointing to one or two reference blocks, indication information of a picture in which the reference block is located (which is usually denoted as a reference frame index), and the like.

Prediction by using the first reference picture list is to select a reference picture from the first reference picture list to obtain a reference block. Prediction by using the second reference picture list is to select a reference picture from the second reference picture list to obtain a reference block. Prediction by using the two lists is to select a reference picture from each of the first reference picture list and the second reference picture list to obtain reference blocks. When prediction is performed by using the two lists, there are two reference blocks. Each reference block needs to be indicated by using a motion vector and a reference frame index of the reference block, and a predictor of a pixel value of a pixel in the picture block is determined based on pixel values of pixels in the two reference blocks.

There is a high temporal correlation between neighboring pictures in a video. Therefore, each picture may be divided into several non-overlapping picture blocks, and it is considered that motion of all pixels in the picture blocks is the same. A motion vector is allocated per picture block. In the embodiments of this application, a to-be-encoded (or to-be-decoded) picture is referred to as a current picture, and a picture block that is being encoded (or being decoded) in the to-be-encoded (or to-be-decoded) picture is referred to as a current picture block. When inter prediction is performed on the current picture block in the current picture, an encoded picture is used as a reference picture, and a motion search is performed on the current picture block in a specific search area in the reference picture, to find a matched block meeting a matching criterion for the current picture block. A relative offset between spatial locations of the current picture block and the matched block in the reference picture is a motion vector. When encoding the video, an encoder side encodes information about the reference picture, information about the motion vector, and residual information, and then sends encoded information to a decoder side. The decoder side finds, from the decoded reference picture, a reference block at a location to which the motion vector points, and adds a pixel value of a pixel in the reference block and the residual information to obtain a pixel value of a pixel in the current picture block. In this way, the decoder side can restore the current picture block.

The following explains and describes a display order index (picture_order_index, POI) and a decoding order index (decode_order_index, DOI).

A video sequence is a top-level syntax structure of a bitstream. The video sequence starts with the first sequence header, and ends with a sequence end code or a video edit code. A sequence header between the first sequence header of the video sequence and a sequence end code or video edit code that appears first is a duplicate sequence header. Each sequence header is followed by one or more encoded pictures, and each encoded picture follows a picture header. Encoded data of an encoded picture starts with a picture start code and ends with the sequence start code, the sequence end code, or a next picture start code. A sequence header corresponding to an encoded picture is a closest sequence header before the encoded picture according to a decoding order.

Pictures are arranged in a bitstream in a bitstream order. The bitstream order is the same as the decoding order, while the decoding order may be different from a display order. The decoding order is an order of decoding encoded pictures based on a prediction relationship between the encoded pictures. The display order is an order of displaying decoded pictures. A POI of a picture is used to indicate a display order of the picture, and a DOI of the picture is used to indicate a decoding order of the picture.

The encoded pictures may include three types of pictures: an I picture, a P picture, and a B picture. The I picture is a reference frame in decoding, and is a picture obtained through intra compression coding. The P picture is a forward prediction frame, and is obtained through prediction according to a previous I picture or P picture. The B picture is a bidirectional prediction frame, and is obtained by performing bidirectional prediction on a closest adjacent I picture or P picture (which is before or after the B picture). If the video sequence includes no B picture, the decoding order is the same as the display order. If the video sequence includes a B picture, the decoding order is different from the display order, the decoded pictures need to be reordered before being output for displaying. As a result, a picture display delay exists.

The technical solutions in the embodiments of this application may not only be applied to an existing video coding standard (such as H.264 or HEVC), but also be applied to a future video coding standard (such as H.266). Terms used in implementations of this application are merely intended to explain specific embodiments of this application, and are not intended to limit this application. The following first briefly describes some concepts that may be used in the embodiments of this application.

Video coding usually refers to processing of a sequence of pictures that form a video or a video sequence. In the field of video coding, the terms "picture (picture)", "frame (frame)", and "image (image)" may be used as synonyms. Video encoding is performed on a source side, and usually includes processing (for example, by compression) an original video picture by an encoder to reduce an amount of data for representing the video picture, for more efficient storage and/or transmission. Video decoding is performed on a destination side, and typically includes inverse processing performed by a decoder relative to the encoder to reconstruct a video picture.

A video sequence includes a series of pictures, a picture is further split into slices (slice), and a slice is further split into blocks (block). Video coding is performed by block. In some new video coding standards, the concept "block" is further expanded. For example, in the H.264 standard, there is a macroblock (MB), and the macroblock may be further split into a plurality of prediction blocks that can be used for predictive coding. In the HEVC standard, a plurality of block units are classified by functions according to basic concepts such as coding unit (CU), prediction unit (PU), and transform unit (TU), and are described by using a new tree-based structure. For example, a CU may be split into smaller CUs based on a quadtree, and the smaller CU may be further split, to generate a quadtree structure. The CU is a basic unit for splitting and encoding a coded picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a CTU is split into a plurality of CUs by using a quadtree structure represented as a coding tree. A decision on whether to encode a picture area by using inter-picture (temporal) or intra-picture (spatial) prediction is made at a CU level. Each CU may be further split into one, two, or four PUs based on a PU split pattern. In one PU, a same prediction process is applied, and related information is transmitted to the decoder on a PU basis. After a residual block is obtained by applying the prediction process based on the PU split pattern, the CU may be partitioned into TUs based on another quadtree structure similar to the coding tree used for the CU. In the recent development of video compression technologies, a quadtree plus binary tree (QTBT) partition frame is used to partition a coding block. In a QTBT block structure, the CU may have a shape of square or rectangular.

In this specification, for ease of description and understanding, a to-be-processed picture block in a current picture may be referred to as a current block. For example, in encoding, the current block is a block that is currently being encoded; and in decoding, the current block is a block that is currently being decoded. A decoded picture block, in a reference picture, used to predict the current block is referred to as a reference block. To be specific, the reference block is a block that provides a reference signal for the current block, and the reference signal represents a pixel value in the reference block. A block that is in the reference picture and that provides a prediction signal for the current block may be referred to as a prediction block. The prediction signal represents a pixel value in the prediction block. For example, after traversal of a plurality of reference blocks, an optimal reference block is found. The optimal reference block provides prediction for the current block, and this optimal reference block may be referred to as a prediction block.

In a case of lossless video coding, the original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data required for representing the video picture, and the video picture cannot be completely reconstructed on the decoder side. To be specific, quality of a reconstructed video picture is lower or poorer than quality of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on the encoder side, a video is usually processed, that is, encoded, at a block (video block) level. For example, a prediction block is generated through spatial (intra-picture) prediction and temporal (inter-picture) prediction, the prediction block is subtracted from a current block (a block being processed or to be processed) to obtain a residual block, and the residual block is transformed in the transform domain and quantized to reduce an amount of data that is to be transmitted (compressed). On the decoder side, inverse processing relative to the encoder is performed on an encoded block or a compressed block to reconstruct the current block for representation. Furthermore, the encoder duplicates a processing loop of the decoder, so that the encoder and the decoder generate same prediction (for example, intra prediction and inter prediction) and/or reconstruction for processing, that is, for coding a subsequent block.

The following describes a system architecture used in the embodiments of this application. FIG. 1 is a schematic block diagram of an example of a video encoding and decoding system 10 according to an embodiment of this application. As shown in FIG. 1, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or a comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (virtual reality, VR) picture); and/or any combination thereof (for example, an augmented reality (augmented reality, AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. Quantities of samples in horizontal and vertical directions (or axes) of the array or the picture define a size and/or resolution of the picture. For representation of a color, typically three color components are used. To be specific, the picture may be represented as or include three sample arrays. For example, in an RGB format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L instead) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of this application, a picture transmitted by the picture source 16 to a picture processor may also be referred to as original picture data 17.

The picture preprocessor 18 is configured to receive the original picture data 17 and perform preprocessing on the original picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (for example, a prediction mode in the embodiments of this specification), to provide encoded picture data 21 (details of a structure of the encoder 20 are further described below based on FIG. 3, FIG. 5, or FIG. 6). In some embodiments, the encoder 20 may be configured to perform each embodiment described below, to implement encoder-side application of a picture display order determining method described in the present invention.

The communications interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communications interface 22 may be, for example, configured to package the encoded picture data 21 in an appropriate format, for example, into a data packet for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 331 (details of a structure of the decoder 30 are further described below based on FIG. 4, FIG. 5, or FIG. 6). In some embodiments, the decoder 30 may be configured to perform each embodiment described below, to implement decoder-side application of a picture display order determining method described in the present invention.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any types of other displays.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or the corresponding functionality and the destination device 14 or the corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1 may vary depending on an actual device and application. The source device 12 and the destination device 14 may include any of a wide range of devices, including any type of handheld or stationary device, for example, a notebook or laptop computer, a mobile phone, a smartphone, a tablet or a tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1 is merely an example and the technologies of this application are applicable to video coding settings (for example, video encoding or video decoding) that do not necessarily include any data communication between an encoding device and a decoding device. In other examples, data may be retrieved from a local memory, streamed over a network, or the like. A video encoding device may encode data and store the data into a memory, and/or a video decoding device may retrieve data from the memory and decode the data. In some examples, encoding and decoding are performed by devices that do not communicate with each other but only encode data to a memory and/or retrieve data from the memory and decode the data.

Figure 2:
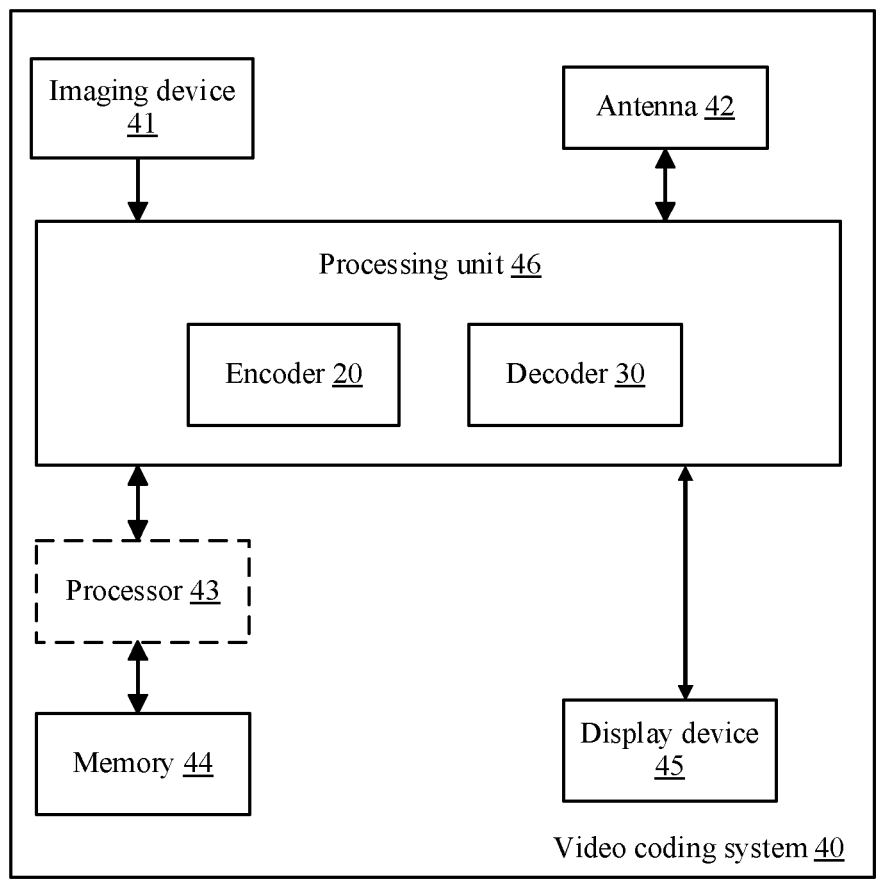
FIG. 2 is a block diagram of a video coding system according to an embodiment of this application.
Figure 3:
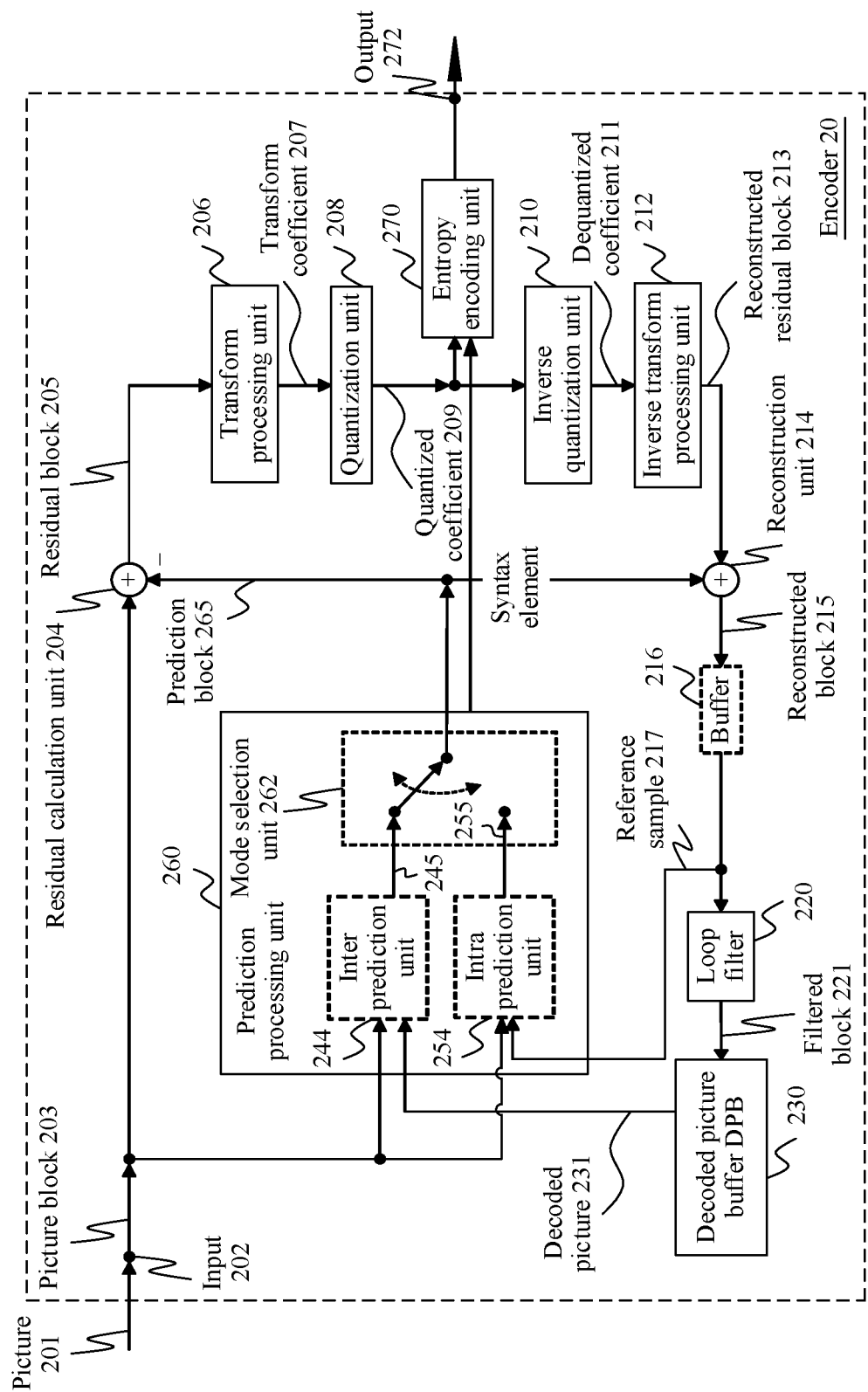
FIG. 3 is a block diagram of an encoder according to an embodiment of this application.
Figure 4:
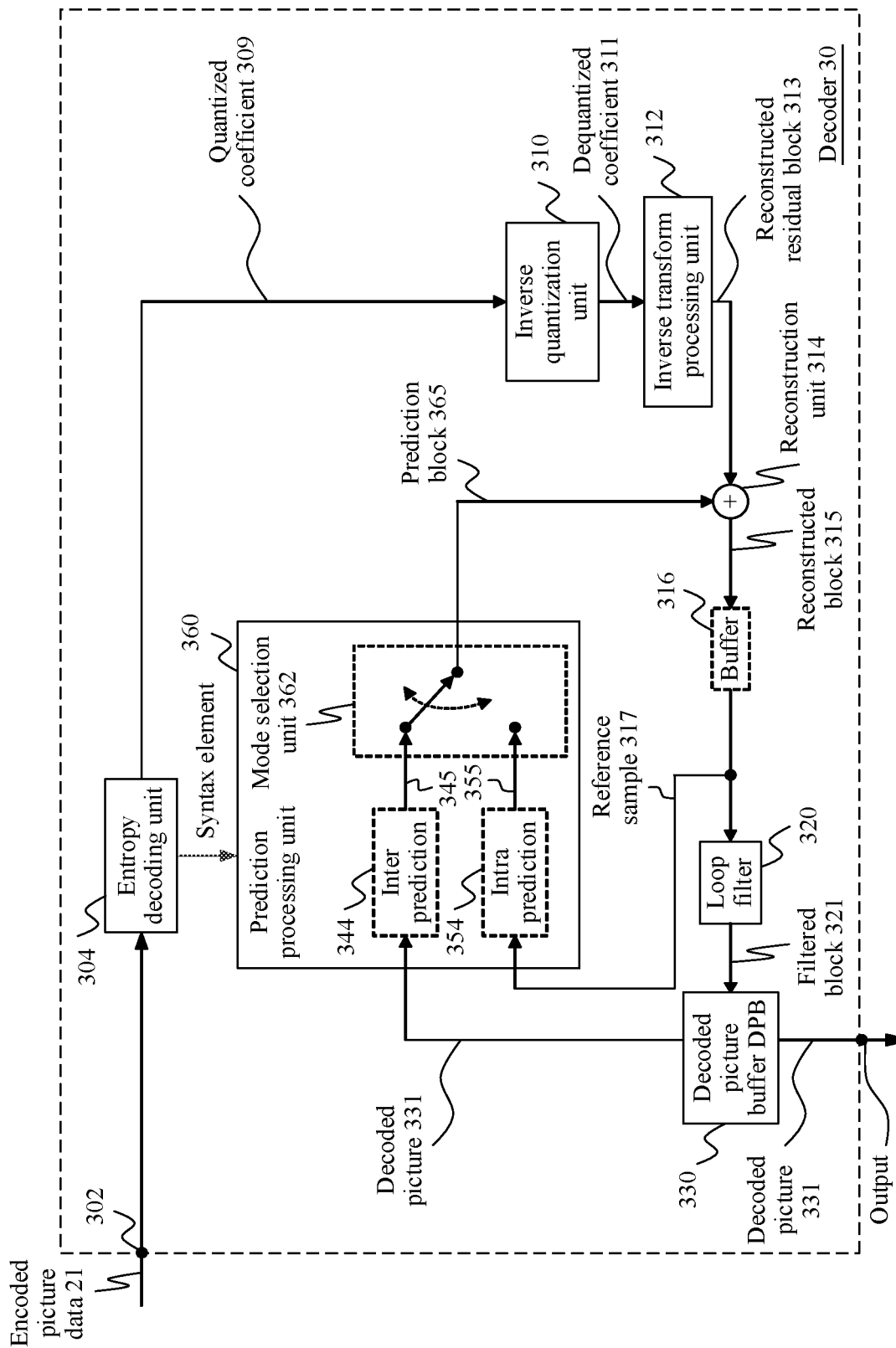
FIG. 4 is a block diagram of a decoder according to an embodiment of this application.

FIG. 2 is an illustrative diagram of an example of a video coding system 40 including an encoder 20 in FIG. 3 and/or a decoder 30 in FIG. 4 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by using a logic circuit 47 of a processing unit 46), an antenna 42, one or more processors 43, one or more memories 44, and/or a display device 45.

As shown in FIG. 2, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with both the encoder 20 and the decoder 30, in different examples, the video coding system 40 may include only the encoder 20 or only the decoder 30.

In some examples, the antenna 42 may be configured to transmit or receive an encoded bitstream of video data. In addition, in some examples, the display device 45 may be configured to present the video data. In some examples, the logic circuit may be implemented by the processing unit 46. The processing unit 46 may include ASIC logic, a graphics processor, a general-purpose processor, and the like. The video coding system 40 may also include the optional processor 43. The optional processor 43 may similarly include ASIC logic, a graphics processor, a general-purpose processor, and the like. In some examples, the logic circuit may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-limitative example, the memory 44 may be implemented as a cache memory. In some examples, the logic circuit may access the memory 44 (for example, for implementing a picture buffer). In other examples, the logic circuit and/or the processing unit 46 may include a memory (for example, a cache) for implementing a picture buffer or the like.

In some examples, the encoder 20 implemented by using the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by using the logic circuit, to implement various modules that are described with reference to FIG. 3 and/or any other encoder system or subsystem described in this specification. The logic circuit may be configured to perform various operations described in this specification.

In some examples, the decoder 30 may be implemented by using the logic circuit in a similar manner, to implement various modules that are described with reference to the decoder 30 in FIG. 4 and/or any other decoder system or subsystem described in this specification. In some examples, the decoder 30 implemented by using the logic circuit may include a picture buffer (implemented by the processing unit 46 or the memory 44) and a graphics processing unit (for example, implemented by the processing unit 46). The graphics processing unit may be communicatively coupled to the picture buffer. The graphics processing unit may include the decoder 30 implemented by using the logic circuit, to implement various modules that are described with reference to FIG. 4 and/or any other decoder system or subsystem described in this specification.

In some examples, the antenna 42 may be configured to receive an encoded bitstream of video data. As described, the encoded bitstream may include data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further include the decoder 30 coupled to the antenna 42 and configured to decode the encoded bitstream. The display device 45 is configured to present a video frame.

It should be understood that, in this embodiment of this application, relative to the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse the syntax element and correspondingly decode the related video data.

It should be noted that the encoder 20 and the decoder 30 in this embodiment of this application may be, for example, an encoder/decoder corresponding to a video standard protocol such as H.263, H.264, HEVC, MPEG-2, MPEG-4, VP8, or VP9, or a next-generation video standard protocol (such as H.266).

FIG. 3 is a schematic/conceptual block diagram of an example of an encoder 20 according to an embodiment of this application. In the example of FIG. 3, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 3 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 4).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

In an embodiment, the encoder 20 may include a partitioning unit (not shown in FIG. 3), configured to partition the picture 201 into a plurality of blocks such as picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 3 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scaling factor is usually selected based on some constraints. For example, the scaling factor is a power of two for a shift operation, a bit depth of the transform coefficient, and a tradeoff between accuracy and implementation costs. For example, a specific scaling factor is specified for the inverse transform by, for example, the inverse transform processing unit 212 on the decoder side 30 (and a corresponding inverse transform by, for example, the inverse transform processing unit 212 on the encoder 20 side), and correspondingly, a corresponding scaling factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (quantization parameter, QP). For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step), or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (discrete cosine transform, DCT) or an inverse discrete sine transform (discrete sine transform, DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220, and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 3) are/is used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters including, for example, a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 220 is shown as an in-loop filter in FIG. 2, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (decoded picture buffer, DPB) 230 may be a reference picture memory that stores reference picture data for use in encoding video data by the encoder 20. The DPB 230 may be formed by any one of a variety of memory devices such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, a previously reconstructed and filtered block 221, of the same current picture or of a different picture, for example, a previously reconstructed picture, and may provide a complete previously reconstructed, that is, decoded, picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), that is, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least some decoded pictures stored in the DBP 230, as described above) and other inter prediction parameters, for example, depends on whether an entire reference picture or only a part of the reference picture, for example, a search window region around a region of the current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (AMVP) mode and a merge (merge) mode. In specific implementation, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be used in the embodiments of this application.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (motion estimation, ME) unit (not shown in FIG. 3) and a motion compensation (motion compensation, MC) unit (not shown in FIG. 3). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 231 one or two motion vectors, or in other words, the current picture and the previously decoded pictures 231 may be a part of or form a sequence of pictures forming the video sequence.

For example, the encoder 20 may be configured to select a reference block from a plurality of reference blocks of a same picture or different pictures in a plurality of other pictures, and provide, for the motion estimation unit (not shown in FIG. 3), a reference picture and/or provide an offset (a spatial offset) between a location (coordinates X and Y) of the reference block and a location of the current block as an inter prediction parameter. This offset is also referred to as a motion vector (motion vector, MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 3) may include extracting or generating a prediction block based on a motion/block vector determined through motion estimation (interpolation may be performed to sub-pixel precision). Interpolation filtering may generate an additional pixel sample from a known pixel sample. This potentially increases a quantity of candidate prediction blocks that may be used to encode a picture block. Upon receiving a motion vector for a PU of the current picture block, a motion compensation unit 246 may locate a prediction block to which the motion vector points in one reference picture list. The motion compensation unit 246 may further generate syntax elements associated with a block and a video slice, for decoding a picture block in the video slice by the decoder 30.

Specifically, the inter prediction unit 244 may transmit the syntax elements to the entropy encoding unit 270. The syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax elements. In this case, the decoder side 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Specifically, the intra prediction unit 254 may transmit syntax elements to the entropy encoding unit 270. The syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax elements. In this case, the decoder side 30 may directly perform decoding in a default prediction mode.

The entropy encoding unit 270 is configured to apply (or skip applying) an entropy encoding algorithm or scheme (for example, a variable length coding (VLC) scheme, a context adaptive VLC (CAVLC) scheme, an arithmetic coding scheme, a context adaptive binary arithmetic coding (CABAC) scheme, a syntax-based context-adaptive binary arithmetic coding (SBAC) scheme, a probability interval partitioning entropy (PIPE) coding scheme, or another entropy coding methodology or technology) to one or all of following: the quantized residual coefficient 209, the inter prediction parameter, the intra prediction parameter, and/or the loop filter parameter, to obtain encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Other structural variations of the video encoder 20 may be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

It should be understood that other structural variations of the video encoder 20 may be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 of the video encoder 20 may be combined. The loop filter 220 is optional. In addition, in a case of lossless compression coding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be selectively enabled.

FIG. 4 is a schematic/conceptual block diagram of an example of a decoder 30 according to an embodiment of this application. The video decoder 30 is configured to receive encoded picture data (for example, an encoded bitstream) 21 encoded by, for example, the encoder 20, to obtain a decoded picture 331. In a decoding process, the video decoder 30 receives video data from the video encoder 20, for example, an encoded video bitstream that represents a picture block in an encoded video slice and an associated syntax element.

In the example of FIG. 4, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with reference to the video encoder 20 in FIG. 3.

The entropy decoding unit 304 is configured to entropy decode the encoded picture data 21 to obtain, for example, a quantized coefficient 309 and/or a decoded encoding parameter (not shown in FIG. 4), for example, any one or all of the following: an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block in the current video slice based on a signaled intra prediction mode and data that is from a previously decoded block of a current frame or picture. When a video slice is encoded as an inter-encoded (B or P) slice, the inter prediction unit 344 (for example, a motion compensation unit) of the prediction processing unit 360 is configured to generate the prediction block 365 for a video block in the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block in the current video slice by parsing the motion vector and the another syntax element, and use the prediction information to generate the prediction block for the current video block that is being decoded. In an example of the present invention, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector for each inter-encoded video block in the slice, an inter prediction status of each inter-encoded video block in the slice, and other information, to decode the video block in the current video slice. In another example of this disclosure, the syntax elements received by the video decoder 30 from a bitstream include syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (either during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters including, for example, a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 320 is shown as an in-loop filter in FIG. 4, in other configurations, the loop filter unit 320 may be implemented as a post-loop filter.

A decoded video block in a given frame or picture is then stored in the decoded picture buffer 330 that stores a reference picture used for subsequent motion compensation.

The decoder 30 is configured to, for example, output a decoded picture 331 through an output 332, for presentation to a user or viewing by a user.

Other variations of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

It should be understood that other structural variations of the video decoder 30 may be used to decode an encoded video bitstream. For example, the video decoder 30 may generate an output video stream without processing by the filter 320. Alternatively, for some picture blocks or picture frames, the entropy decoding unit 304 of the video decoder 30 does not obtain a quantized coefficient through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that, in different application scenarios, the inter prediction unit and the intra prediction unit may be selectively enabled.

It should be understood that, in the encoder 20 and the decoder 30 in this application, a processing result of a step may be further processed and then output to a next step. For example, after a step such as interpolation filtering, motion vector derivation, or loop filtering, an operation such as clip or shift (shift) is further performed on a processing result of a corresponding step.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit depth of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. For another example, the value of the motion vector (for example, motion vectors MVs of four 4×4 subblocks within one 8×8 picture block) is constrained so that a maximum difference between integer parts of the MVs of the four 4×4 subblocks does not exceed N pixels, for example, not exceed 1 pixel.

The following two manners may be used to constrain the value of the motion vector to be within the specific bit depth range:

Manner 1: Remove an overflow most significant bit of the motion vector:

$ux = (vx + 2^{bitDepth}) \% 2^{bitDepth}$ $vx = (ux >= 2^{bitDepth-1}) ? (ux - 2^{bitDepth}) : ux$ $uy = (vy + 2^{bitDepth}) \% 2^{bitDepth}$ $vy = (uy >= 2^{bitDepth-1}) ? (uy - 2^{bitDepth}) : uy$ where vx represents a horizontal component of the motion vector of the picture block or the subblock of the picture block, vy represents a vertical component of the motion vector of the picture block or the subblock of the picture block, and ux and uy are intermediate values, and bitDepth represents a bit depth.

For example, a value of vx is −32769, and 32767 is derived according to the foregoing formulas. A value is stored in a computer in a two's complement representation, a two's complement representation of −32769 is 1,0111, 1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clip the motion vector according to the following formulas:

$$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx represents a horizontal component of the motion vector of the picture block or the subblock of the picture block, and vy represents a vertical component of the motion vector of the picture block or the subblock of the picture block, x, y, and z are respectively corresponding to three input values of an MV clamping process Clip3, and Clip3 is defined to indicate clipping a value of z into a range [x, y]:

$$\text{Clip3}(x, y, z) = \begin{cases} x; & z \square x \\ y; & z \square y \\ z; & \text{otherwise} \end{cases}$$

Figure 5:
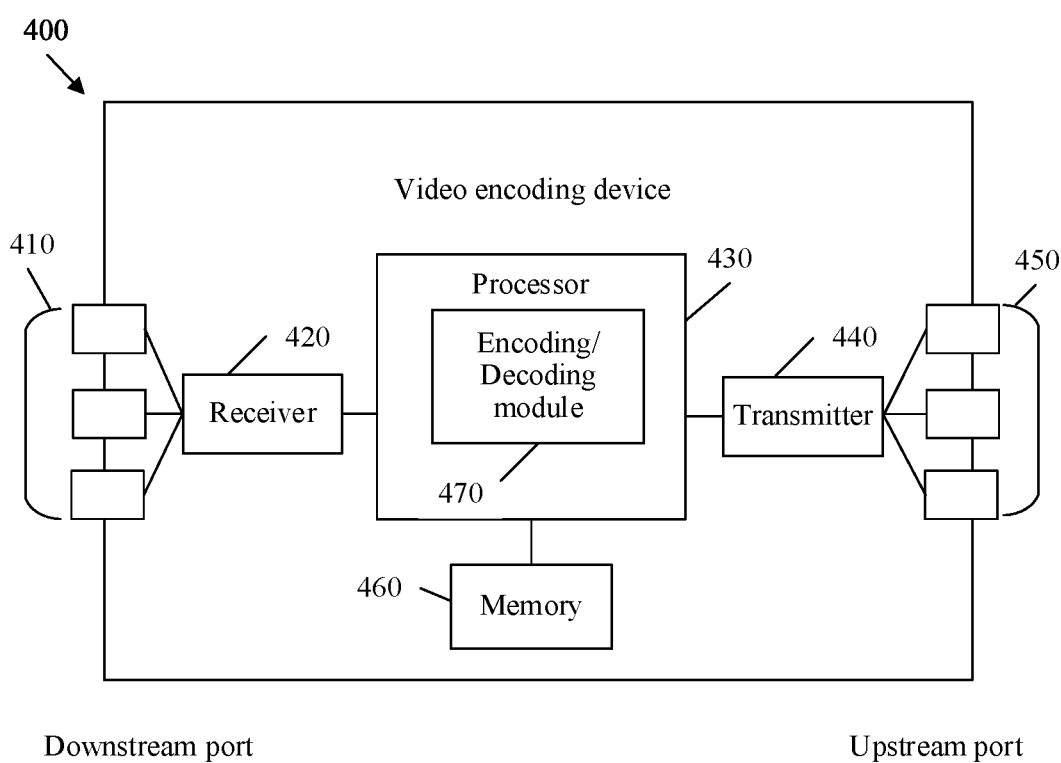
FIG. 5 is a schematic structural diagram of a video coding device according to an embodiment of this application.

FIG. 5 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1) or a video encoder (for example, the encoder 20 in FIG. 1). In another embodiment, the video coding device 400 may be one or more components of the decoder 30 in FIG. 1 or of the encoder 20 in FIG. 1.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component that are coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement a picture display order determining method provided in the embodiments of this application. For example, the encoding/decoding module 470 implements, processes, or provides various coding operations. Therefore, the encoding/decoding module 470 substantially improves functions of the video coding device 400, and affects a transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 6:
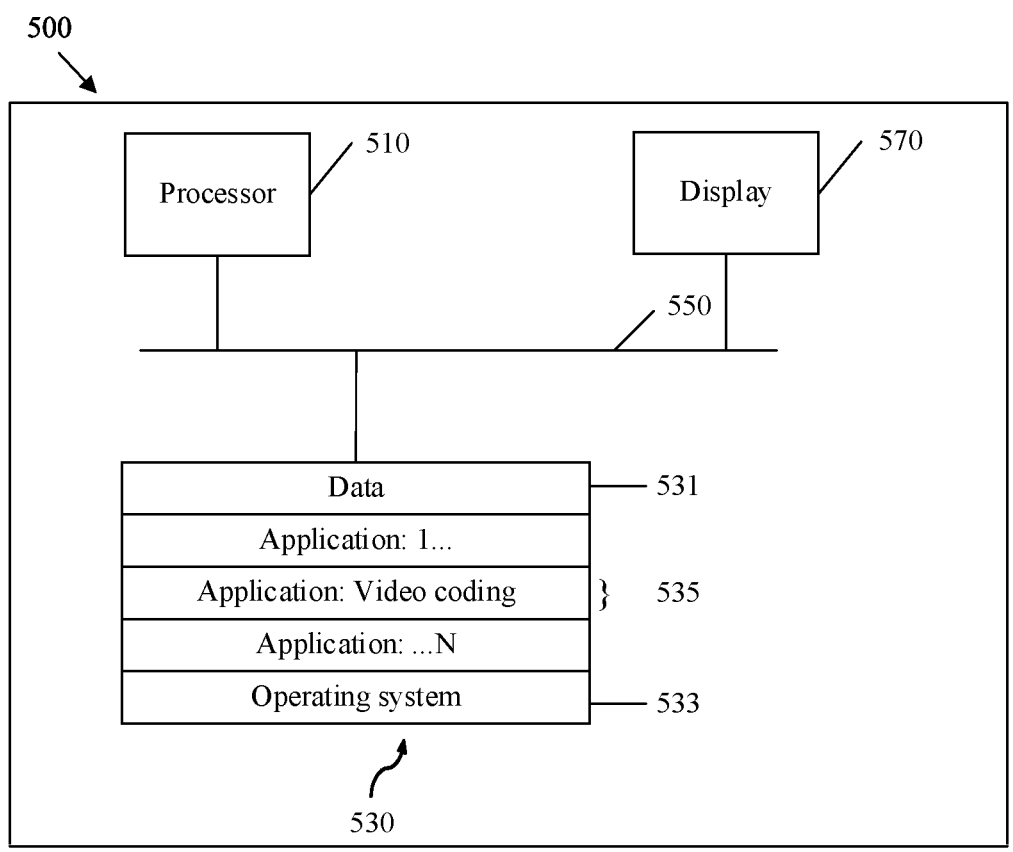
FIG. 6 is a block diagram of an encoding device or a decoding device according to an embodiment of this application.

FIG. 6 is a simplified block diagram of an apparatus 500 that may be used as either or two of the source device 12 and the destination device 14 in FIG. 1 according to an example embodiment. The apparatus 500 may implement the technologies of this application. In other words, FIG. 6 is a schematic block diagram of an implementation of an encoding device or a decoding device (briefly referred to as a coding device 500) according to an embodiment of this application. The coding device 500 may include a processor 510, a memory 530, and a bus system 550. The processor 510 and the memory 530 are connected through the bus system 550. The memory 530 is configured to store instructions. The processor 510 is configured to execute the instructions stored in the memory 530. The memory 530 of the coding device 500 stores program code. The processor 510 may invoke the program code stored in the memory 530 to perform various video encoding or decoding methods described in this application. To avoid repetition, details are not described herein.

In this embodiment of this application, the processor 510 may be a central processing unit (Central Processing Unit, "CPU" for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 that are accessed by the processor 510 through the bus 550. The memory 530 may further include an operating system 533 and an application program 535. The application program 535 includes at least one program that allows the processor 510 to perform a video encoding or decoding method described in this application. For example, the application program 535 may include applications 1 to N, and further includes a video encoding or decoding application (briefly referred to as a video coding application) that is used to perform the video encoding or decoding method described in this application.

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following explains and describes in detail a picture display order determining method provided in the embodiments of this application.

Figure 7:
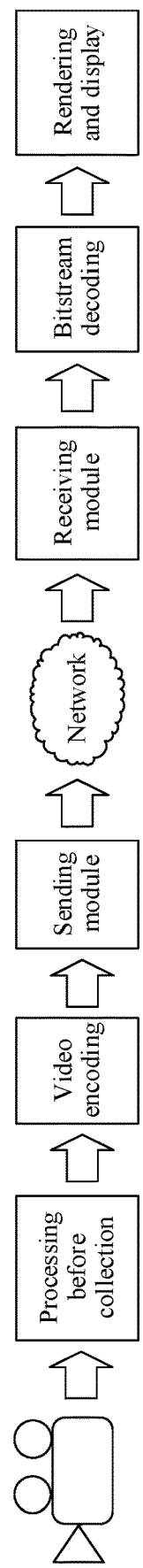
FIG. 7 is a schematic diagram of a video transmission system according to an embodiment of this application.

A system architecture applicable to the picture display order determining method provided in the embodiments of this application is shown in FIG. 7. A video transmission system usually includes collection, encoding, sending, receiving, decoding, and display components. A collection module includes a camera or a camera module and a pre-processor, and converts an optical signal into a digital video sequence. Then, the video sequence is encoded by an encoder and converted into a bitstream. Then, the bitstream is sent by a sending module to a receiving module via a network, and the bitstream received by the receiving module is decoded and reconstructed by a decoder into the video sequence. Finally, the reconstructed video sequence undergoes post processing such as rendering, and sent to a display device for display.

A picture display order determining method provided in the embodiments of this application is mainly used in video encoding and video decoding, and specifically related to sequence header parsing syntax, picture header parsing syntax, and inter prediction. The picture display order determining method provided in the embodiments of this application may be applied to an apparatus or a product including a function of an encoder/a decoder, for example, a video processing software/hardware product such as a chip, and applied to a product or an apparatus including such a chip, for example, a product of a media type such as a mobile phone.

Specifically, the encoder side may encode a video picture to obtain a bitstream, and after the encoder side sends the bitstream to the decoder side, the decoder side may decode the bitstream to reconstruct the video picture.

After receiving the bitstream, the decoder side may start a video sequence decoding process. When a sequence header or a sequence start code appears, specifically, in a first step, a cycle identifier value is set to 0, and an initialization operation such as clearing a reference picture buffer may be further performed. In a second step, a weighted quantization matrix is determined. In a third step, pictures are sequentially decoded until a sequence start code, a sequence end code, or a video edit code appears. In a fourth step, if the sequence start code appears, the first step is returned to; if the sequence end code or the video edit code appears, pictures in the reference picture buffer are output in ascending order of POIs.

It should be noted that, before the first step is performed, an initialization identifier value may be first set to 0, to indicate that initialization has not been performed. Then, after the first step is performed, the initialization identifier value is set to 1, to indicate that initialization has been performed. Finally, before the second step is performed, whether the initialization identifier value is 1 is first determined; and when the initialization identifier value is 1, the second step is performed; or when the initialization identifier value is not 1, the first step is returned to.

Figure 8:
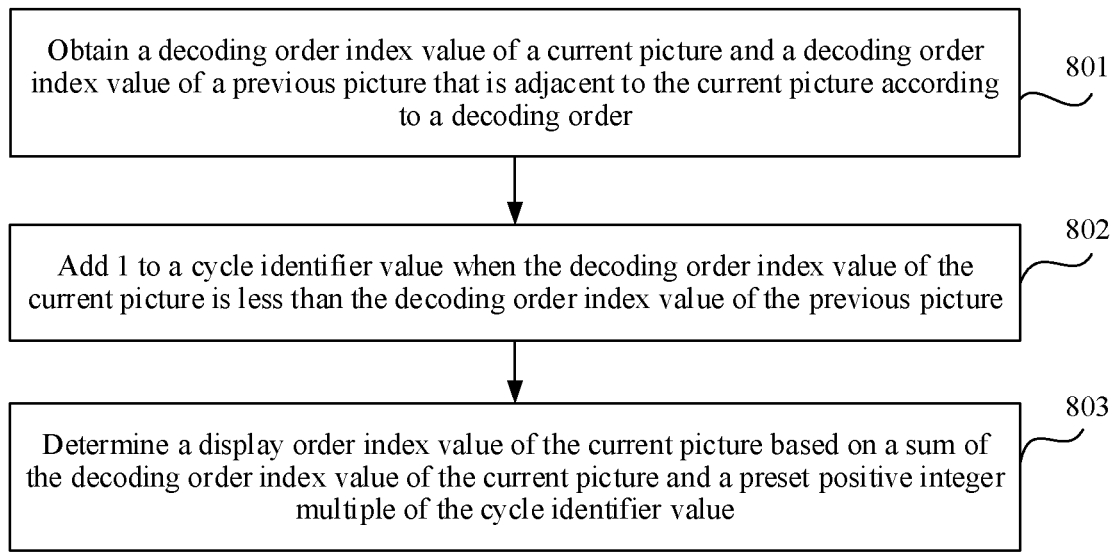
FIG. 8 is a flowchart of a picture display order determining method according to an embodiment of this application.

The following embodiment in FIG. 8 is used in the foregoing picture decoding process in the third step. In this picture decoding process, a picture header of a current picture needs to be first decoded. Specifically, a picture start code of the current picture may be first decoded, and then parameters related to prediction and quantization are initialized. Subsequently, a POI is calculated. This process is to be explained and described in detail in the following embodiment in FIG. 8. Finally, a quantity of reference pictures of the current picture is initialized. In addition, if weighted quantization may be performed on the current picture, a weighted quantization matrix is derived from a bitstream of the picture header of the current picture.

FIG. 8 is a flowchart of a picture display order determining method according to an embodiment of this application. As shown in FIG. 8, the method includes the following steps.

Step 801: Obtain a decoding order index value of a current picture and a decoding order index value of a previous picture that is adjacent to the current picture according to a decoding order.

It should be noted that a decoding order index value is used to indicate a decoding order of a picture, and may be directly obtained from a bitstream. For example, the decoding order index value of the current picture may be obtained from a bitstream of a picture header of the current picture, and the decoding order index value of the previous picture may be obtained from a bitstream of a picture header of the previous picture.

In addition, decoding order index values of pictures are usually cyclic. For example, for a plurality of pictures in a video sequence, decoding order index values of the plurality of pictures may be cyclic from 0 to 255 in order.

Further, the previous picture that is adjacent to the current picture according to the decoding order is a picture that is latest decoded before the current picture according to the decoding order. When the current picture is the first frame of picture in a video sequence, there is no previous picture that is adjacent to the current picture according to the decoding order. In this case, it may be determined that the decoding order index value of the previous picture that is adjacent to the current picture according to the decoding order is any value that is not greater than the decoding order index value of the current picture.

It should be noted that a parameter DOIPrev may be set, so that it is convenient to obtain the decoding order index value of the previous picture that is adjacent to the current picture according to the decoding order. In a picture decoding process, whenever the decoding order index value of the previous picture that is adjacent to the current picture according to the decoding order needs to be obtained, a value of DOIPrev may be directly used as the decoding order index value of the previous picture that is adjacent to the current picture according to the decoding order. In this case, DOIPrev may be set to 0 during decoding of a sequence header or a sequence start code of the video sequence in which the current picture is located. When the first frame of picture in the video sequence is subsequently decoded, in other words, when the current picture is the first frame of picture, the value of DOIPrev (that is, 0) may be directly used as the decoding order index value of the previous picture that is adjacent to the current picture according to the decoding order. In this case, the decoding order index value of the current picture is not less than the decoding order index value of the previous picture.

Step 802: Add 1 to a cycle identifier value when the decoding order index value of the current picture is less than the decoding order index value of the previous picture.

Further, when the decoding order index value of the current picture is not less than the decoding order index value of the previous picture, the cycle identifier value remains unchanged.

To be specific, when the decoding order index value of the current picture is less than the decoding order index value of the previous picture, the cycle identifier value is updated, and an updated cycle identifier value is a value obtained by adding 1 to the original cycle identifier value. When the decoding order index value of the current picture is not less than the decoding order index value of the previous picture, the cycle identifier value is not updated, and the current cycle identifier value is still used.

When the decoding order index value of the current picture is less than the decoding order index value of the previous picture, it indicates that the decoding order index value of the current picture and the decoding order index value of the previous picture do not belong to a same cycle, in other words, the decoding order index value of the current picture has entered a next cycle. In this case, the cycle identifier value may be updated by adding 1 to the cycle identifier value, so that subsequently, a display order index value is progressively increasing based on the updated cycle identifier value and the decoding order index value of the current picture. When the decoding order index value of the current picture is not less than the decoding order index value of the previous picture, it indicates that the decoding order index value of the current picture and the decoding order index value of the previous picture belong to a same cycle. In this case, the cycle identifier value may not be updated, and subsequently, a display order index value is progressively increasing directly based on the current cycle identifier value and the decoding order index value of the current picture.

It should be noted that, in this embodiment of this application, the cycle identifier value may be set to 0 during decoding of the sequence header or the sequence start code of the video sequence in which the current picture is located. Decoding of the sequence header or the sequence start code of the video sequence in which the current picture is located means that decoding of the video sequence is just started, and therefore the cycle identifier value can be set to 0. In this case, when a decoding order index value of a picture in the video sequence belongs to the first cycle, the cycle identifier value is not introduced into calculation of a display order index value. Subsequently, the cycle identifier value is updated by adding 1 to the cycle identifier value each time the decoding order index value of the picture in the video sequence enters a new cycle, and the display order index value is calculated by using an updated cycle identifier value in the new cycle.

Step 803: Determine a display order index value of the current picture based on the sum of the decoding order index value of the current picture and the preset positive integer multiple of the cycle identifier value.

It should be noted that the preset positive integer may be preset, and may be set based on a quantity of pictures whose decoding order index values belong to one cycle. For example, the preset positive integer may be equal to the quantity of pictures whose decoding order index values belong to one cycle. Assuming that decoding order index values of pictures in a video sequence are cycled from 0 to 255 in order, the preset positive integer may be 256.

It should be noted that, in a related technology, the display order index value of the current picture is directly determined based on the decoding order index value of the current picture. Because decoding order index values of pictures are cyclic, display order index values of the pictures are also cyclic. However, in this embodiment of this application, the display order index value of the current picture is determined based on the sum of the decoding order index value of the current picture and the preset positive integer multiple of the cycle identifier value. Because the preset positive integer multiple of the cycle identifier value is a quantity of pictures whose decoding order index values belong to all cycles before a cycle in which the current picture is located, when the display order index value of the current picture is determined based on the sum of the decoding order index value of the current picture and the preset positive integer multiple of the cycle identifier value, the display order index value of the current picture is progressively increasing based on a display order index value of a picture that is located before the current picture according to the decoding order. In other words, in this embodiment of this application, a decoding order index value of a picture is cyclic, and a display order index value of the picture is progressively increasing.

It should be noted that, after the display order index value of the current picture is determined, the decoding order index value of the current picture may be assigned to DOIPrev, in other words, DOIPrev is set to the decoding order index value of the current picture, to facilitate decoding of a subsequent picture. In this way, when the subsequent picture is decoded, a value of DOIPrev may be directly used as a decoding order index value of a previous picture that is adjacent to the picture according to the decoding order.

Specifically, the display order index value of the current picture may be determined according to a formula: POI=DOI+PictureOutputDelay−OutputReorderDelay+ length×DOICycleCnt.

It should be noted that, POI represents the display order index value of the current picture, DOI represents the decoding order index value of the current picture, length represents the preset positive integer, and DOICycleCnt represents the cycle identifier value.

In addition, PictureOutputDelay represents a picture output delay value, indicating a waiting time from completion of decoding of the picture to output of the picture for display, and may be measured by using a quantity of pictures as a unit. PictureOutputDelay may be equal to a value of a syntax element picture_output_delay included in the bitstream of the picture header of the current picture.

In addition, OutputReorderDelay represents a picture reordering delay value, indicating a reordering delay caused because a picture decoding order is different from a display order, and may be measured by using a quantity of pictures as a unit. When a value of a syntax element low_delay (a low-delay flag) carried in the bitstream of the picture header of the current picture is 0, OutputReorderDelay is equal to a value of a syntax element output_reorder_delay included in the bitstream of the picture header of the current picture. When the value of low_delay is 1, the value of OutputReorderDelay is 0.

It should be noted that, when the decoding order index value of the current picture is less than the decoding order index value of the previous picture, 1 is added to the cycle identifier value, to obtain a new cycle identifier value; or when the decoding order index value of the current picture is not less than the decoding order index value of the previous picture, the cycle identifier value is not updated. Then, the display order index value of the current picture is obtained by adding the decoding order index value of the current picture and the picture output delay value, then subtracting the picture reordering delay value, and finally adding a product of the preset positive integer and the cycle identifier value. In this way, the display order index value of the current picture is progressively increasing based on a display order index value of a picture that is located before the current picture according to the decoding order.

In addition, after the display order index value of the current picture is obtained, a display order corresponding to the current picture may be determined based on the display order index value of the current picture, and then the current picture may be output for display according to the display order corresponding to the current picture.

Further, in this embodiment of this application, not only the display order index value of the current picture can be calculated, but also a decoding order index value of a picture in a reference picture buffer of the current picture can be updated, so that subsequently, a picture can be obtained more quickly from the reference picture buffer based on an updated decoding order index value and output for display.

It should be noted that the reference picture buffer of the current picture stores a reference picture of the current picture, and the reference picture of the current picture is a picture that is in the video sequence in which the current picture is located and that has been decoded but has not been output for display. The reference picture buffer of the current picture may include a library picture, and may further include a non-library picture. The library picture is a reference picture that is not in a current bitstream and that is used to decode the current bitstream, and the library picture is not output for display. For example, the library picture may be a reference picture externally input from a decoder.

Specifically, when the decoding order index value of the current picture is less than the decoding order index value of the previous picture, the preset positive integer is subtracted from each of decoding order index values of all pictures in the reference picture buffer of the current picture, to update the decoding order index values of all the pictures in the reference picture buffer, or the preset positive integer is subtracted from each of decoding order index values of pictures other than the library picture in the reference picture buffer of the current picture, to update the decoding order index values of the pictures other than the library picture in the reference picture buffer.

It should be noted that reference pictures stored in the reference picture buffer of the current picture may be output for display in order in real time. Optionally, to ensure output efficiency of a picture and prediction accuracy of the picture, an absolute value of a difference between a display order index value of any picture in the reference picture buffer of the current picture and the display order index value of the current picture may be less than a value obtained by dividing the preset positive integer by 2. Alternatively, an absolute value of a difference between a display order index value of any picture other than the library picture in the reference picture buffer of the current picture and the display order index value of the current picture may be less than a value obtained by dividing the preset positive integer by 2.

It should be noted that, during decoding of pictures, a decoded picture may be first stored into the reference picture buffer, and then pictures are obtained from the reference picture buffer in order and output for display. An absolute value of a difference between each of display order index values of pictures in the reference picture buffer and the display order index value of the current picture needs to be less than the value obtained by dividing the preset positive integer By 2, to avoid an excessively high picture output delay. If the absolute value of the difference between the display order index value of the picture in the reference picture buffer and the display order index value of the current picture is not less than the value obtained by dividing the preset positive integer by 2, storing a picture into the reference picture buffer is suspended. Instead, a picture in the reference picture buffer is first output for display, and a picture is resumed being stored into the reference picture buffer until an absolute value of a difference between a display order index value of a picture in the reference picture buffer and the display order index value of the current picture is less than the value obtained by dividing the preset positive integer by 2.

Further, after the display order index value of the current picture is obtained, motion information of the current picture may be determined based on the display order index value of the current picture, so that subsequently, the current picture may be decoded based on the motion information of the current picture. Specifically, the motion information of the current picture may be obtained based on the display order index value of the current picture and a display order index value of the reference picture of the current picture.

It should be noted that the motion information of the current picture may be motion information (motionInfo0) of a current picture block in the current picture, and the motion information of the current picture block may include indication information of a prediction direction (which is usually prediction by using a first reference picture list, prediction by using a second reference picture list, or prediction by using both the lists, and for example, may be information indicated by a prediction reference mode identifier interpred_ref_mode), one or two motion vectors pointing to one or two reference blocks, indication information of a picture in which the reference block is located (usually referred to as a reference frame index), and the like.

In addition, the reference picture of the current picture may be at least one of a reference picture in the first reference picture list corresponding to the current picture and a reference picture in the second reference picture list corresponding to the current picture. For example, the reference pictures of the current picture may be a picture whose reference frame index value is 0 in the first reference picture list and a picture whose reference frame index value is 0 in the second reference picture list. The first reference picture list and the second reference picture list may be pre-established, and the first reference picture list and the second reference picture list may each include a picture that is located before the current picture according to a decoding order and that has been decoded.

It should be noted that, generally, when the motion information is derived by using the first reference picture list, the indication information of the prediction direction may be set to 0; when the motion information is derived by using the second reference picture list, the indication information of the prediction direction may be set to 1; or when the motion information is derived by using both the first reference picture list and the second reference picture list, the indication information of the prediction direction may be set to 2.

Specifically, the operation of obtaining the motion information of the current picture based on the display order index value of the current picture and the display order index value of the reference picture of the current picture may be: determining a distance index value of the current picture based on the display order index value of the current picture; determining a distance index value of the reference picture based on the display order index value of the reference picture or the display order index value of the current picture; subtracting the distance index value of the reference picture from the distance index value of the current picture, to obtain a distance between the current picture and the reference picture; and determining the motion information of the current picture based on the distance between the current picture and the reference picture.

For example, when the reference picture of the current picture is in the first reference picture list, the distance between the current picture and the reference picture may be obtained according to a formula: $BlockDistanceL0 = DistanceIndexE - DistanceIndexL0$, where BlockDistanceL0 represents the distance between the current picture and the reference picture, DistanceIndexE represents the distance index value of the current picture, and DistanceIndexL0 represents the distance index value of the reference picture.

For another example, when the reference picture of the current picture is in the second reference picture list, the distance between the current picture and the reference picture may be obtained according to a formula: $BlockDistanceL1 = DistanceIndexE - DistanceIndexL1$, where BlockDistanceL1 represents the distance between the current picture and the reference picture, DistanceIndexE represents the distance index value of the current picture, and DistanceIndexL1 represents the distance index value of the reference picture.

It should be noted that the reference picture of the current picture is a picture in which a reference block of the current picture block in the current picture is located, and the distance between the current picture and the reference picture is a distance between the current picture block and the reference block.

In addition, a distance index value of a picture is used to indicate a distance between the picture and a reference picture of the picture, and may be specifically used to indicate a distance between a picture block in the picture and a reference block (belonging to the reference picture of the picture) pointed by a motion vector of the picture block. The distance index value of the picture may be obtained from a bitstream of a picture header of the picture.

During determining the distance index value of the current picture based on the display order index value of the current picture, 2 may be multiplied by the display order index value of the current picture, and an obtained value is used as the distance index value of the current picture.

During determining the distance index value of the reference picture based on the display order index value of the reference picture or the display order index value of the current picture, when the reference picture is a library picture, 2 is multiplied by a value obtained by subtracting 1 from the display order index value of the current picture, and an obtained value is used as the distance index value of the reference picture; or when the reference picture is not a library picture, 2 is multiplied by the display order index value of the reference picture, and an obtained value is used as the distance index value of the reference picture.

The operation of determining the motion information of the current picture based on the distance between the current picture and the reference picture may be: determining a colocated picture of the current picture; determining a colocated picture block that is in the colocated picture and whose location is the same as a location of the current picture block in the current picture; obtaining a motion vector of the colocated picture block; obtaining a distance between the colocated picture and a colocated reference picture, where the colocated reference picture is a picture in which a picture block pointed by the motion vector of the colocated picture block is located; and scaling the motion vector of the colocated picture block based on the distance between the current picture and the reference picture of the current picture and the distance between the colocated picture and the colocated reference picture, to obtain a motion vector of the current picture block.

It should be noted that the colocated picture of the current picture may be a picture that is in decoded pictures and whose display order index value is relatively close to the display order index value of the current picture. For example, the colocated picture of the current picture may be a previous picture that is adjacent to the current picture according to the display order. Alternatively, the colocated picture of the current picture may be obtained based on a bitstream. To be specific, the bitstream may include information used to indicate the colocated picture of the current picture. The information may include indication information of a list in which the colocated picture is located and an index number of the colocated picture. For example, the information may indicate that the colocated picture of the current picture is a reference picture whose index number is 0 in the first reference picture list.

In addition, the colocated picture block in the colocated picture may be specifically a picture block that is in the colocated picture and that includes a luma sample at a location corresponding to a location of a top-left luma sample of the current picture block in the current picture. In this case, the motion vector of the colocated picture block is a motion vector of the luma sample. The motion vector of the colocated picture block may be obtained from a motion information storage unit corresponding to the colocated picture block.

In addition, there is a high temporal correlation between the current picture and the colocated picture. Therefore, motion of the current picture block in the current picture is relatively close to motion of the colocated picture block in the colocated picture, and the motion vector of the current picture block can be obtained by scaling the motion vector of the colocated picture block based on the distance between the current picture and the reference picture of the current picture and the distance between the colocated picture and the colocated reference picture.

During obtaining the distance between the colocated picture and the colocated reference picture, a distance index value of the colocated picture and a distance index value of the colocated reference picture may be obtained, and the distance index value of the colocated reference picture is subtracted from the distance index value of the colocated picture, to obtain the distance between the colocated picture and the colocated reference picture.

For example, the distance between the colocated picture and the colocated reference picture may be obtained according to a formula: BlockDistanceRef=DistanceIndexCol−DistanceIndexRef, where BlockDistanceRef represents the distance between the colocated picture and the colocated reference picture, DistanceIndexCol represents the distance index value of the colocated picture, and DistanceIndexRef represents the distance index value of the colocated reference picture.

Generally, a motion vector scaling method includes temporal motion vector scaling and spatial motion vector scaling.

A temporal motion vector scaling method is as follows: A reference picture whose display order index value is closest to the display order index value of the current picture (denoted as CurPoi) is found from a reference picture list and used as the colocated picture, where the display order index value of the colocated picture is denoted as ColPoi, and the display order index value of the reference picture of the current picture is denoted as RefPoi, and a display order index value of a reference picture of the colocated picture is denoted as ColRefPoi, and a motion vector of a colocated reference block that is in the colocated picture and that corresponds to the current picture block in the current picture is denoted as MVcol. The motion vector of the current picture block is represented as MVcur, and MVcur may be derived according to a formula:

$$MVcur = \frac{CurPoi - RefPoi}{ColPoi - ColRefPoi} MVcol.$$

A spatial motion vector scaling method is as a formula, where display order index value of the current picture is denoted as CurPoi, DesPoi represents a display order index value of a reference picture in which a reference block of the current picture block in the current picture is located, NeiPoi represents a display order index value of a reference picture in which a reference block of a neighboring picture block of the current picture block in the current picture is located, and MVn represents a motion vector of the neighboring picture block. The motion vector of the current picture block is represented as MVcur, and MVcur may be derived according to a formula:

$$MVcur = \frac{CurPoi - DesPoi}{CurPoi - NeiPoi} MVn.$$

In this embodiment of this application, the motion vector of the current picture block is obtained by using the temporal motion vector scaling method. Specifically, the motion vector of the current picture block may be determined according to the following formulas:

mv$E\_x$=Clip3(−32768,32767,Sign(mvRef_x×
 BlockDistance$L$×BlockDistanceRef)×(((Abs
 (mvRef_x×BlockDistance$L$×(16384/BlockDis-
 tanceRef)))+8192)>>14)), and $mvE\_y=\text{Clip3}(-32768,32767,\text{Sign}(mvRef\_y \times BlockDistanceL \times BlockDistanceRef) \times (((\text{Abs}(mvRef\_y \times BlockDistanceL \times (16384/BlockDistanceRef)))+8192)>>14))$, where mvE_x represents a horizontal component of the motion vector of the current picture block, mvE_y represents a vertical component of the motion vector of the current picture block, mvRef_x represents a horizontal component of the motion vector of the colocated picture block, mvRef_y represents a vertical component of the motion vector of the colocated picture block, BlockDistanceL represents the distance between the current picture and the reference picture of the current picture, and BlockDistanceRef represents the distance between the colocated picture and the colocated reference picture.

For example, when both the reference picture and the colocated picture of the current picture are in the first reference picture list, assuming that the index number of the colocated picture is 0, a reference frame index (RefIdxL0) may be set to 0, and the motion vector of the current picture block in the current picture is obtained according to the following formulas:

$mvE\_x=\text{Clip3}(-32768,32767,\text{Sign}(mvRef\_x \times BlockDistanceL0 \times BlockDistanceRef) \times (((\text{Abs}(mvRef\_x \times BlockDistanceL0 \times (16384/BlockDistanceRef)))+8192)>>14))$, and $mvE\_y=\text{Clip3}(-32768,32767,\text{Sign}(mvRef\_y \times BlockDistanceL0 \times BlockDistanceRef) \times (((\text{Abs}(mvRef\_y \times BlockDistanceL0 \times (16384/BlockDistanceRef)))+8192)>>14))$, where mvE0_x represents a horizontal component of the motion vector of the current picture block, mvE0_y represents a vertical component of the motion vector of the current picture block, mvRef_x represents a horizontal component of the motion vector of the colocated picture block in the colocated picture of the current picture, mvRef_y represents a vertical component of the motion vector of the colocated picture block in the colocated picture, BlockDistanceL represents the distance between the current picture and the reference picture of the current picture, and BlockDistanceRef represents the distance between the colocated picture and the colocated reference picture.

For another example, when both the reference picture and the colocated picture of the current picture are in the second reference picture list, assuming that the index number of the colocated picture is 0, a reference frame index (RefIdxL1) may be set to 0, and the motion vector of the current picture block in the current picture is obtained according to the following formulas:

$mvE1\_x=\text{Clip3}(-32768,32767,\text{Sign}(mvRef\_x \times BlockDistanceL1 \times BlockDistanceRef) \times (((\text{Abs}(mvRef\_x \times BlockDistanceL1 \times (16384/BlockDistanceRef)))+8192)>>14))$, and $mvE1\_y=\text{Clip3}(-32768,32767,\text{Sign}(mvRef\_y \times BlockDistanceL1 \times BlockDistanceRef) \times (((\text{Abs}(mvRef\_y \times BlockDistanceL1 \times (16384/BlockDistanceRef)))+8192)>>14))$, where mvE1_x represents a horizontal component of the motion vector of the current picture block, mvE1_y represents a vertical component of the motion vector of the current picture block, mvRef_x represents a horizontal component of the motion vector of the colocated picture block in the colocated picture of the current picture, mvRef_y represents a vertical component of the motion vector of the colocated picture block in the colocated picture, BlockDistanceL represents the distance between the current picture and the reference picture of the current picture, and BlockDistanceRef represents the distance between the colocated picture and the colocated reference picture.

It should be noted that, in this embodiment of this application, an operation of calculating a distance between pictures in a motion information derivation process can be simplified, and a motion vector scaling operation performed by using the temporal motion vector scaling method can be simplified. Scaling can be directly performed, and there is no need to perform other determining. Therefore, coding complexity can be reduced, and coding performance can be improved.

In this embodiment of this application, the decoding order index value of the current picture and the decoding order index value of the previous picture that is adjacent to the current picture according to the decoding order are obtained, and then 1 is added to the cycle identifier value when the decoding order index value of the current picture is less than the decoding order index value of the previous picture. Then, the display order index value of the current picture is determined based on the sum of the decoding order index value of the current picture and the preset positive integer multiple of the cycle identifier value. Because the preset positive integer multiple of the cycle identifier value is the quantity of pictures whose decoding order index values belong to all cycles before the cycle in which the current picture is located, when the display order index value of the current picture is determined based on the sum of the decoding order index value of the current picture and the preset positive integer multiple of the cycle identifier value, the display order index value of the current picture is progressively increasing based on a display order index value of a picture that is located before the current picture according to the decoding order. In other words, a display order index value of a picture in this embodiment of this application is progressively increasing.

Figure 9:
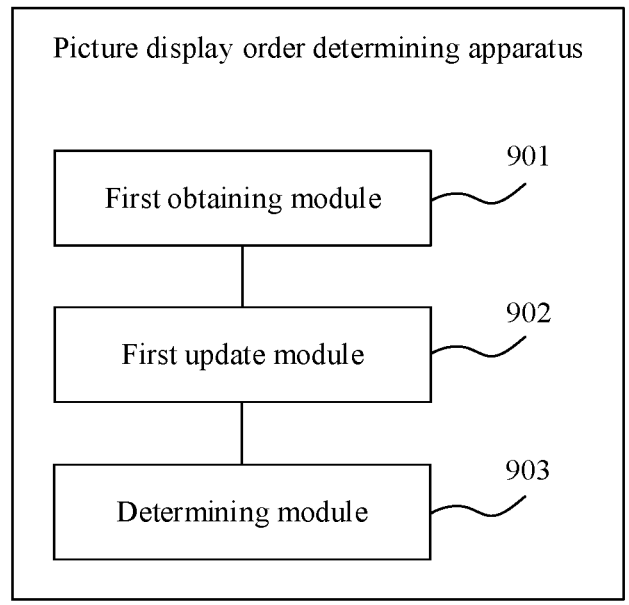
FIG. 9 is a schematic structural diagram of a picture display order determining apparatus according to an embodiment of this application.

FIG. 9 is a schematic structural diagram of a picture display order determining apparatus according to an embodiment of this application. The picture display order determining apparatus may be implemented by using software, hardware, or a combination thereof as a part or all of a video coding device. As shown in FIG. 9, the apparatus includes a first obtaining module 901, a first updating module 902, and a determining module 903.

The first obtaining module 901 is configured to obtain a decoding order index value of a current picture and a decoding order index value of a previous picture that is adjacent to the current picture according to a decoding order.

The first updating module 902 is configured to add 1 to a cycle identifier value when the decoding order index value of the current picture is less than the decoding order index value of the previous picture.

The determining module 903 is configured to determine a display order index value of the current picture based on a sum of the decoding order index value of the current picture and a preset positive integer multiple of the cycle identifier value.

Optionally, the display order index value of the current picture is determined according to the following formula:

$$POI=DOI+PictureOutputDelay-OutputReorderDelay+length \times DOICycleCnt,$$

where

POI represents the display order index value of the current picture, DOI represents the decoding order index value of the current picture, PictureOutputDelay represents a picture output delay value, OutputReorderDelay represents a picture reordering delay value, length represents the preset positive integer, and DOICycleCnt represents the cycle identifier value.

Optionally, the apparatus further includes:

a second updating module, configured to subtract the preset positive integer from each of decoding order index values of all pictures in a reference picture buffer of the current picture when the decoding order index value of the current picture is less than the decoding order index value of the previous picture, to update the decoding order index values of all the pictures.

Optionally, an absolute value of a difference between a display order index value of any picture in the reference picture buffer and the display order index value of the current picture is less than a value obtained by dividing the preset positive integer by 2.

Optionally, the preset positive integer is 256.

Optionally, the apparatus further includes:

a setting module, configured to set the cycle identifier value to 0 when a sequence header or a sequence start code of a video sequence in which the current picture is located is decoded.

Optionally, the apparatus further includes:

a second obtaining module, configured to obtain motion information of the current picture based on the display order index value of the current picture and a display order index value of a reference picture of the current picture.

Optionally, the second obtaining module includes:

a first determining unit, configured to determine a distance index value of the current picture based on the display order index value of the current picture;

a second determining unit, configured to determine a distance index value of the reference picture based on the display order index value of the reference picture or the display order index value of the current picture;

a calculation unit, configured to subtract the distance index value of the reference picture from the distance index value of the current picture, to obtain a distance between the current picture and the reference picture; and a third determining unit, configured to determine the motion information of the current picture based on the distance between the current picture and the reference picture.

Optionally, the first determining unit is configured to:

multiply 2 by the display order index value of the current picture, and use an obtained value as the distance index value of the current picture.

Optionally, the second determining unit is configured to:

when the reference picture is a library picture, multiply 2 by a value obtained by subtracting 1 from the display order index value of the current picture, and use an obtained value as the distance index value of the reference picture; or when the reference picture is not a library picture, multiply 2 by the display order index value of the reference picture, and use an obtained value as the distance index value of the reference picture.

Optionally, the third determining unit is configured to:

determine a colocated picture of the current picture;

determine a colocated picture block that is in the colocated picture and whose location is the same as a location of a current picture block in the current picture;

obtain a motion vector of the colocated picture block;

obtain a distance between the colocated picture and a colocated reference picture, where the colocated reference picture is a picture in which a picture block pointed by the motion vector of the colocated picture block is located; and scale the motion vector of the colocated picture block based on the distance between the current picture and the reference picture and the distance between the colocated picture and the colocated reference picture, to obtain a motion vector of the current picture block.

Optionally, the third determining unit is configured to:

obtain a distance index value of the colocated picture and a distance index value of the colocated reference picture; and subtract the distance index value of the colocated reference picture from the distance index value of the colocated picture, to obtain the distance between the colocated picture and the colocated reference picture.

Optionally, the motion vector of the current picture block is determined according to the following formulas:

$$mvE\_x = \text{Clip3}(-32768, 32767, \text{Sign}(mvRef\_x \times BlockDistanceL \times BlockDistanceRef) \times (((\text{Abs}(mvRef\_x \times BlockDistanceL \times (16384/BlockDistanceRef))) + 8192) >> 14)), \text{ and}$$

$$mvE\_y = \text{Clip3}(-32768, 32767, \text{Sign}(mvRef\_y \times BlockDistanceL \times BlockDistanceRef) \times (((\text{Abs}(mvRef\_y \times BlockDistanceL \times (16384/BlockDistanceRef))) + 8192) >> 14)), \text{ where}$$

mvE_x represents a horizontal component of the motion vector of the current picture block, mvE_y represents a vertical component of the motion vector of the current picture block, mvRef_x represents a horizontal component of the motion vector of the colocated picture block, mvRef_y represents a vertical component of the motion vector of the colocated picture block, BlockDistanceL represents the distance between the current picture and the reference picture, and BlockDistanceRef represents the distance between the colocated picture and the colocated reference picture.

In this embodiment of this application, the decoding order index value of the current picture and the decoding order index value of the previous picture that is adjacent to the current picture according to the decoding order are obtained, and then 1 is added to the cycle identifier value when the decoding order index value of the current picture is less than the decoding order index value of the previous picture. Then, the display order index value of the current picture is determined based on the sum of the decoding order index value of the current picture and the preset positive integer multiple of the cycle identifier value. Because the preset positive integer multiple of the cycle identifier value is a quantity of pictures whose decoding order index values belong to all cycles before a cycle in which the current picture is located, when the display order index value of the current picture is determined based on the sum of the decoding order index value of the current picture and the preset positive integer multiple of the cycle identifier value, the display order index value of the current picture is progressively increasing based on a display order index value of a picture that is located before the current picture according to the decoding order. In other words, a display order index value of a picture in this embodiment of this application is progressively increasing.

It should be noted that, division into the foregoing functional modules is merely used as an example for description when the picture display order determining apparatus provided in the foregoing embodiments determines a display order of a picture. In actual application, the foregoing functions may be allocated to different functional modules and implemented based on a requirement. In other words, an inner structure of the apparatus is divided into different functional modules to implement all or some of the functions described above. In addition, the picture display order determining apparatus provided in the foregoing embodiments and the picture display order determining method embodiments pertain to a same idea. For a specific implementation process thereof, refer to the method embodiments. Details are not described herein again.

All or a part of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or may be a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid-state drive (Solid State Disk, SSD)), or the like.

The foregoing descriptions are merely embodiments provided in this application, but are not intended to limit this application. Any modification, equivalent replacement, or improvement made without departing from the spirit and principle of this application shall fall within the protection scope of this application.

What is claimed is:

1. A picture display order determining method, wherein the method comprises:
   receiving a video sequence for processing, wherein the video sequence comprises a plurality of pictures,
   obtaining a decoding order index value of a current picture in the plurality of pictures and a decoding order index value of a previous picture that is adjacent to the current picture according to a decoding order;
   adding 1 to a cycle identifier value when the decoding order index value of the current picture is less than the decoding order index value of the previous picture; and
   determining a display order index value of the current picture based on a sum of the decoding order index value of the current picture and a preset positive integer multiple of the cycle identifier value;
   arranging the plurality of pictures according to the display order index value determined for each of the plurality of pictures.

2. The method according to claim 1, wherein the display order index value of the current picture is determined according to the following formula:

POI=DOI+PictureOutputDelay−OutputReorderDelay+Length×DOICycleCnt, wherein

POI represents the display order index value of the current picture, DOI represents the decoding order index value of the current picture, PictureOutputDelay represents a picture output delay value, OutputReorderDelay represents a picture reordering delay value, length represents the preset positive integer, and DOICycleCnt represents the cycle identifier value.

3. The method according to claim 1, wherein the method further comprises:
   subtracting the preset positive integer from each of decoding order index values of all pictures in a reference picture buffer of the current picture when the decoding order index value of the current picture is less than the decoding order index value of the previous picture, to update the decoding order index values of all the pictures.

4. The method according to claim 3, wherein an absolute value of a difference between a display order index value of any picture in the reference picture buffer and the display order index value of the current picture is less than a value obtained by dividing the preset positive integer by 2.

5. The method according to claim 1, wherein the preset positive integer is 256.

6. The method according to claim 1, wherein the method further comprises:
   setting the cycle identifier value to 0 when a sequence header or a sequence start code of a video sequence in which the current picture is located is decoded.

7. The method according to claim 1, wherein the method further comprises:
   obtaining motion information of the current picture based on the display order index value of the current picture and a display order index value of a reference picture of the current picture.

8. The method according to claim 7, wherein the obtaining motion information of the current picture based on the display order index value of the current picture and a display order index value of a reference picture of the current picture comprises:
   determining a distance index value of the current picture based on the display order index value of the current picture;
   determining a distance index value of the reference picture based on the display order index value of the reference picture or the display order index value of the current picture;
   subtracting the distance index value of the reference picture from the distance index value of the current picture, to obtain a distance between the current picture and the reference picture; and
   determining the motion information of the current picture based on the distance between the current picture and the reference picture.

9. The method according to claim 8, wherein the determining a distance index value of the current picture based on the display order index value of the current picture comprises:
   multiplying 2 by the display order index value of the current picture, and using an obtained value as the distance index value of the current picture.

10. The method according to claim 8, wherein the determining a distance index value of the reference picture based on the display order index value of the reference picture or the display order index value of the current picture comprises:
    when the reference picture is a library picture, multiplying 2 by a value obtained by subtracting 1 from the display order index value of the current picture, and using an obtained value as the distance index value of the reference picture; or when the reference picture is not a library picture, multiplying 2 by the display order index value of the reference picture, and using an obtained value as the distance index value of the reference picture.

11. The method according to claim 8, wherein the determining the motion information of the current picture based on the distance between the current picture and the reference picture comprises:

determining a co-located picture of the current picture;
determining a co-located picture block that is in the co-located picture and whose location is the same as a location of a current picture block in the current picture;
obtaining a motion vector of the co-located picture block;
obtaining a distance between the co-located picture and a co-located reference picture, wherein the co-located reference picture is a picture in which a picture block pointed by the motion vector of the co-located picture block is located; and
scaling the motion vector of the co-located picture block based on the distance between the current picture and the reference picture and the distance between the co-located picture and the co-located reference picture, to obtain a motion vector of the current picture block.

12. The method according to claim 11, wherein the obtaining a distance between the co-located picture and a co-located reference picture comprises:

obtaining a distance index value of the co-located picture and a distance index value of the co-located reference picture; and
subtracting the distance index value of the co-located reference picture from the distance index value of the co-located picture, to obtain the distance between the co-located picture and the co-located reference picture.

13. A picture display order determining apparatus, wherein the apparatus comprises:

a receiver configured to receive a video sequence, wherein the video sequence comprises a plurality of pictures;
a first obtaining circuit, configured to obtain a decoding order index value of a current picture in the plurality of pictures and a decoding order index value of a previous picture that is adjacent to the current picture according to a decoding order;
a first updating circuit, configured to add 1 to a cycle identifier value when the decoding order index value of the current picture is less than the decoding order index value of the previous picture;
a determining circuit, configured to determine a display order index value of the current picture based on a sum of the decoding order index value of the current picture and a preset positive integer multiple of the cycle identifier value; and
an ordering circuit for arranging the plurality of pictures according to the display order index value determined for each of the plurality of pictures.

14. The apparatus according to claim 13, wherein the display order index value of the current picture is determined according to the following formula:

POI=DOI+PictureOutputDelay−OutputReorderDelay+length×DOICycleCnt, wherein

POI represents the display order index value of the current picture, DOI represents the decoding order index value of the current picture, PictureOutputDelay represents a picture output delay value, OutputReorderDelay represents a picture reordering delay value, length represents the preset positive integer, and DOICycleCnt represents the cycle identifier value.

15. The apparatus according to claim 13, wherein the apparatus further comprises:

a second updating circuit, configured to subtract the preset positive integer from each of decoding order index values of all pictures in a reference picture buffer of the current picture when the decoding order index value of the current picture is less than the decoding order index value of the previous picture, to update the decoding order index values of all the pictures.

16. The apparatus according to claim 15, wherein an absolute value of a difference between a display order index value of any picture in the reference picture buffer and the display order index value of the current picture is less than a value obtained by dividing the preset positive integer by 2.

17. The apparatus according to claim 13, wherein the preset positive integer is 256.

18. The apparatus according to claim 13, wherein the apparatus further comprises:

a setting circuit, configured to set the cycle identifier value to 0 when a sequence header or a sequence start code of a video sequence in which the current picture is located is decoded.

19. The apparatus according to claim 14, wherein the apparatus further comprises:

a second obtaining circuit, configured to obtain motion information of the current picture based on the display order index value of the current picture and a display order index value of a reference picture of the current picture.

20. A video coding device, wherein the device comprises a memory and a processor that are coupled to each other, the processor invokes program code stored in the memory, to perform the method according to claim 1.

* * * * *